(12) United States Patent
Weinmann et al.

(10) Patent No.: US 7,741,741 B2
(45) Date of Patent: Jun. 22, 2010

(54) DRIVE APPARATUS FOR A WASHING MACHINE

(75) Inventors: Martin Weinmann, Bad Waldsee (DE); Alexander Müller, Bad Waldsee-Reute (DE); Thomas Mehrer, Wangen (DE)

(73) Assignee: Dielh AKO Stiftung & Co. KG, Wangen (DE)

( * ) Notice: Subject to any disclaimer, the term of this patent is extended or adjusted under 35 U.S.C. 154(b) by 314 days.

(21) Appl. No.: 11/827,839

(22) Filed: Jul. 13, 2007

(65) Prior Publication Data
US 2008/0018182 A1 Jan. 24, 2008

(30) Foreign Application Priority Data
Jul. 13, 2006 (DE) .................. 10 2006 032 356

(51) Int. Cl.
*H02K 11/00* (2006.01)
*D06F 37/30* (2006.01)

(52) U.S. Cl. .............. 310/68 R; 310/67 R; 310/DIG. 6; 310/64

(58) Field of Classification Search ............... 310/67 R, 310/68 R, 68 C, DIG. 6, 89, 254; 68/12.16
See application file for complete search history.

(56) References Cited

U.S. PATENT DOCUMENTS

| | | | | |
|---|---|---|---|---|
| 5,825,107 A | * | 10/1998 | Johnson et al. ............... | 310/64 |
| 5,969,445 A | * | 10/1999 | Horiuchi et al. .............. | 310/64 |
| 6,153,954 A | * | 11/2000 | Uchida et al. ............. | 310/68 C |
| 6,177,740 B1 | * | 1/2001 | Burns ........................ | 310/68 R |
| 6,394,767 B1 | | 5/2002 | Matsumoto | |
| 6,577,030 B2 | * | 6/2003 | Tominaga et al. ......... | 310/68 B |
| 6,713,907 B2 | | 3/2004 | Matsumoto | |
| 6,762,521 B2 | * | 7/2004 | Peter et al. .................... | 310/89 |
| 6,812,604 B2 | * | 11/2004 | Braun et al. ............... | 310/68 D |
| 6,998,740 B2 | * | 2/2006 | Matsuki ........................ | 310/64 |
| 2005/0116554 A1 | | 6/2005 | Dano et al. | |
| 2005/0121986 A1 | * | 6/2005 | Matsuki ........................ | 310/64 |
| 2006/0208582 A1 | * | 9/2006 | Marioni .................... | 310/68 R |

FOREIGN PATENT DOCUMENTS

| | | |
|---|---|---|
| DE | 36 02 606 A1 | 7/1987 |
| DE | 90 17 681 U1 | 11/1991 |
| DE | 196 36 723 A1 | 3/1997 |

(Continued)

*Primary Examiner*—Burton Mullins
(74) *Attorney, Agent, or Firm*—Laurence A. Greenberg; Werner H. Stemer; Ralph E. Locher

(57) ABSTRACT

A drive apparatus for a washing machine includes an electric motor, a drive shaft connected to the electric motor for rotary drive, a fan for cooling the electric motor and electronics for controlling operation of the electric motor. In order to achieve a compact construction, the electric motor and the electronics are integrated in a common unit, such as a motor housing. In order to protect the electronics and at the same time ensure that the electronics are sufficiently cooled, the common unit has a dividing wall, with the electric motor and a printed circuit board of the electronics disposed on opposite sides of the dividing wall. The dividing wall has at least one aperture. The electronics include power components protruding at least partially through the aperture and being in contact with the dividing wall and/or with a cooling air stream generated by the fan.

9 Claims, 2 Drawing Sheets

FOREIGN PATENT DOCUMENTS

| | | |
|---|---|---|
| DE | 197 03 655 C2 | 8/1998 |
| DE | 101 61 367 A1 | 7/2003 |
| DE | 199 49 914 B4 | 9/2005 |
| EP | 1 134 419 A2 | 9/2001 |
| EP | 1 138 242 A2 | 10/2001 |
| JP | 09084294 A | 3/1997 |

* cited by examiner

DRIVE APPARATUS FOR A WASHING MACHINE

CROSS-REFERENCE TO RELATED APPLICATION

This application claims the priority, under 35 U.S.C. §119, of German Patent Application DE 10 2006 032 356.4, filed Jul. 13, 2006; the prior application is herewith incorporated by reference in its entirety.

BACKGROUND OF THE INVENTION

Field of the Invention

The present invention relates to a drive apparatus for a washing machine, including an electric motor, a drive shaft connected to the electric motor for rotary drive purposes, a fan for cooling the electric motor, and electronics for controlling operation of the electric motor.

A drive motor for a washing machine drum with an electronic control system is generally required in order to operate a washing machine. In commercially available washing machines, the electronic control system is predominantly disposed separately from the motor. That prevents heat from the motor and electrical and magnetic interference fields from being transmitted to the electronics. However, some approaches are known which combine the motor electronics and the electric motor to form a compact unit.

German Published, Non-Prosecuted Patent Application DE 36 02 606 A1 describes a washing machine drive including a three-phase motor which is fed through a converter, in which the converter electronics are disposed in a connection box that, as a component which is separate from the motor housing, is fixed in the physical vicinity of, but thermally insulated from, the motor and is provided with cooling ribs on its outer face. A truly compact unit including the motor and the electronics is not proposed therein.

German Utility Model DE 90 17 681 U1 describes a washing machine drive including a three-phase motor which is fed through a converter, in which the converter electronics are disposed in a common housing together with the three-phase motor, the drive shaft which is driven by the motor protrudes to the rear through the electronics, and a fan impeller is mounted on the drive shaft on that side of the electronics which is averted from the motor. The cooling air stream which is generated by the fan impeller first flows past the encapsulated electronics which are provided with cooling ribs on the outside, and then cools the motor. The electronic components are therefore indirectly cooled through the use of the cooling ribs on the converter housing.

German Patent DE 199 49 914 B4 discloses an electric motor configuration including an integrated electronic controller, in which the electronic controller contains a plurality of modules that are mounted on a support which radially surrounds the drive shaft. In that case, the support plate of the control modules is cooled by an air stream.

U.S. Pat. Nos. 6,394,767 and 6,713,907 each disclose a motor including integrated electronics which are disposed in the air stream for cooling the motor but, in a manner which is disadvantageous for the dissipation of heat, are fully encapsulated or are separated from the motor by being encapsulated in a pot.

German Published, Non-Prosecuted Patent Application DE 101 61 367 A1, corresponding to U.S. Patent Application Publication No. US 2005/0116554 A1, exhibits an electric drive unit including a motor and a control module, in which a hub of a fan blade impeller which is placed on the rotary shaft of the electric motor has a double-walled construction and the hollow hub interior which is formed in that way is used to cool the electronics.

German Patent DE 197 03 655 C2 describes an electric drive including an electric motor and power electronics connected upstream, in which the electric motor and the electronics are disposed in a common housing and the electronics are disposed around the motor on supports in a cooling air duct.

The above-mentioned drive apparatuses encounter problems with the integration of the motor and electronics. The electronics have to be protected against electrical and magnetic interference fields, they must not be excessively heated by heat from the motor, and particles of dust and debris which are carried by the cooling air stream must not soil the conductor tracks of the electronics. Various more or less complex approaches to integrating the motor and control electronics arise on the basis of those requirements.

SUMMARY OF THE INVENTION

It is accordingly an object of the invention to provide a drive apparatus for a washing machine, which overcomes the hereinafore-mentioned disadvantages of the heretofore-known apparatuses of this general type and in which the electric motor and electronics are disposed in a compact unit and sufficient cooling of the electronic power components and protection of the electronics against dust in the cooling air stream and electrical and magnetic interference fields of the electric motor are ensured at the same time.

With the foregoing and other objects in view there is provided, in accordance with the invention, a drive apparatus for a washing machine. The drive apparatus comprises an electric motor, a drive shaft connected to the electric motor for rotary drive, a fan generating a cooling air stream for cooling the electric motor, and electronics for controlling operation of the electric motor. The electronics include a printed circuit board and power components. The electric motor and the electronics are integrated in a common unit, for example a common motor housing. The common unit has a dividing or partition wall, for example an end plate of the motor, with at least one aperture formed therein. The electric motor is disposed on one side of the dividing wall and the printed circuit board is disposed on the other side of the dividing wall. The power components protrude at least partially through the at least one aperture and are in contact with the dividing wall and/or with the cooling air stream.

A compact construction is achieved by integrating the electric motor and electronics in a common unit. Since the electric motor is disposed on one side of a dividing or partition wall of the unit and a printed circuit board of the electronics is disposed on the other side of the dividing or partition wall, the electronics are firstly protected against dust and moisture and secondly against electrical and magnetic interference fields which are generated by the electric motor. The power components of the electronics, which require a greater degree of cooling but on the other hand can themselves be better encapsulated against dust and moisture, protrude through the at least one aperture in the dividing or partition wall and can therefore be sufficiently cooled indirectly by the dividing or partition wall which is cooled by the cooling air stream and/or directly by the cooling air stream which is generated by the fan.

With this construction, the electric motor itself requires minor modifications in any case, and the additional space requirement for the electronics in the common unit is minimized. The drive apparatus has been specially developed for a washing machine, for which reason the program sequence which is typical of the washing machine has been taken into account. The washing machine drive only has to emit a low power during a washing cycle. Special cooling of the electronics as well as of the motor is not required, for which reason the low rotational speed of the fan is sufficient in this operating range. During a short spin cycle, the power emitted by the electric motor is several times higher than in the washing mode. However, the fan is also driven at a correspondingly increased rotational speed at the same time, with the result that the greater degree of cooling for the electric motor is achieved and, in particular, the specific power components of the electronics which are particularly thermally loaded during the spin process are cooled to a greater degree. Due to the special cooling of these power components, the power components can also be constructed to be smaller and less expensive.

In accordance with another feature of the invention, the conductor tracks of the printed circuit board are disposed on that side of the printed circuit board which is averted from the dividing or partition wall. In this way, the conductor tracks are on that side which is averted from the cooling air stream of the cooling device and are therefore better protected against soiling.

In accordance with a further feature of the invention, in a drive which is fed by an intermediate circuit and has an asynchronous or synchronous motor, the power components which protrude through the dividing or partition wall are, for example, intermediate circuit capacitors, choking coils for attenuation of harmonics and radio interference suppression coils, mains rectifiers and switch-on current limiters, such as an NTC or fixed resistor.

In accordance with an added feature of the invention, for the purpose of better protection against soiling, the electronics can be entirely or partially coated, encapsulated and/or provided with plastic covers.

In accordance with a concomitant feature of the invention, the dividing or partition wall or the end plate has a substantially rectangular construction.

Other features which are considered as characteristic for the invention are set forth in the appended claims.

Although the invention is illustrated and described herein as embodied in a drive apparatus for a washing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
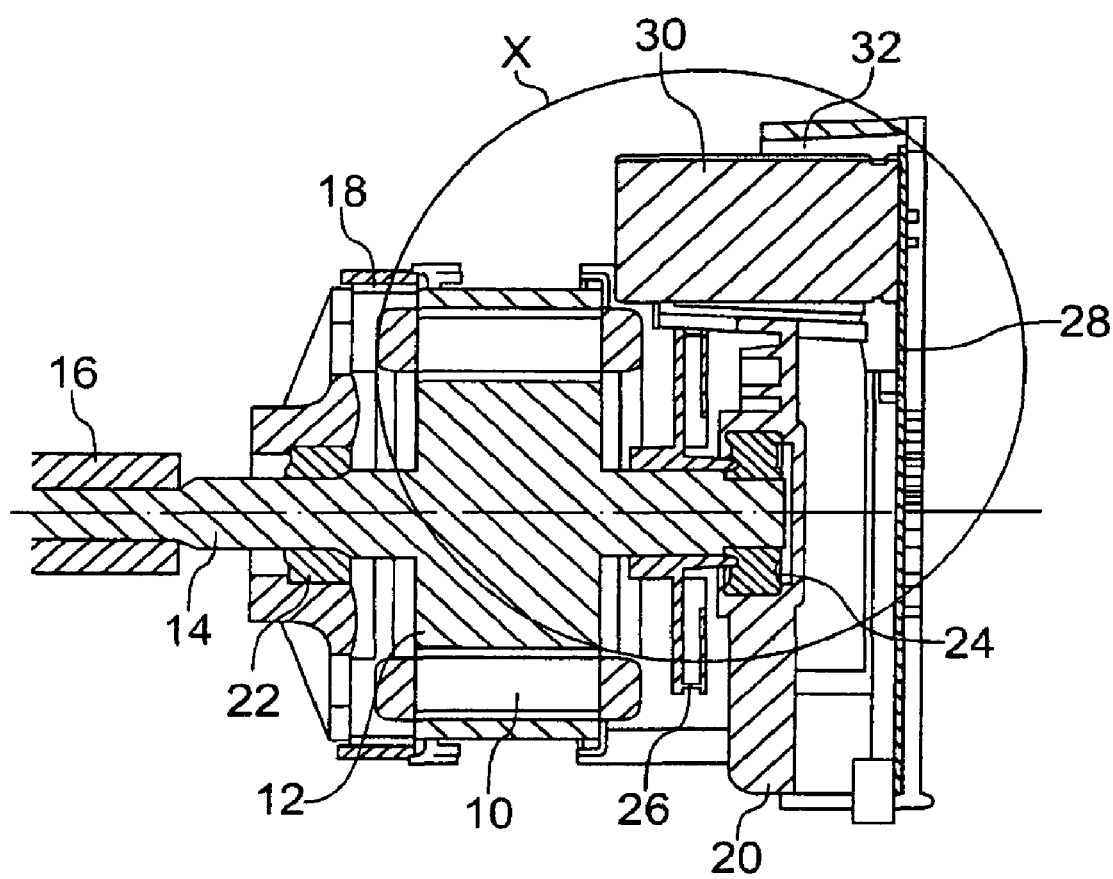
FIG. 1 is a fragmentary, diagrammatic, sectional view of a drive apparatus for a washing machine according to a preferred exemplary embodiment of the invention.
Figure 2:
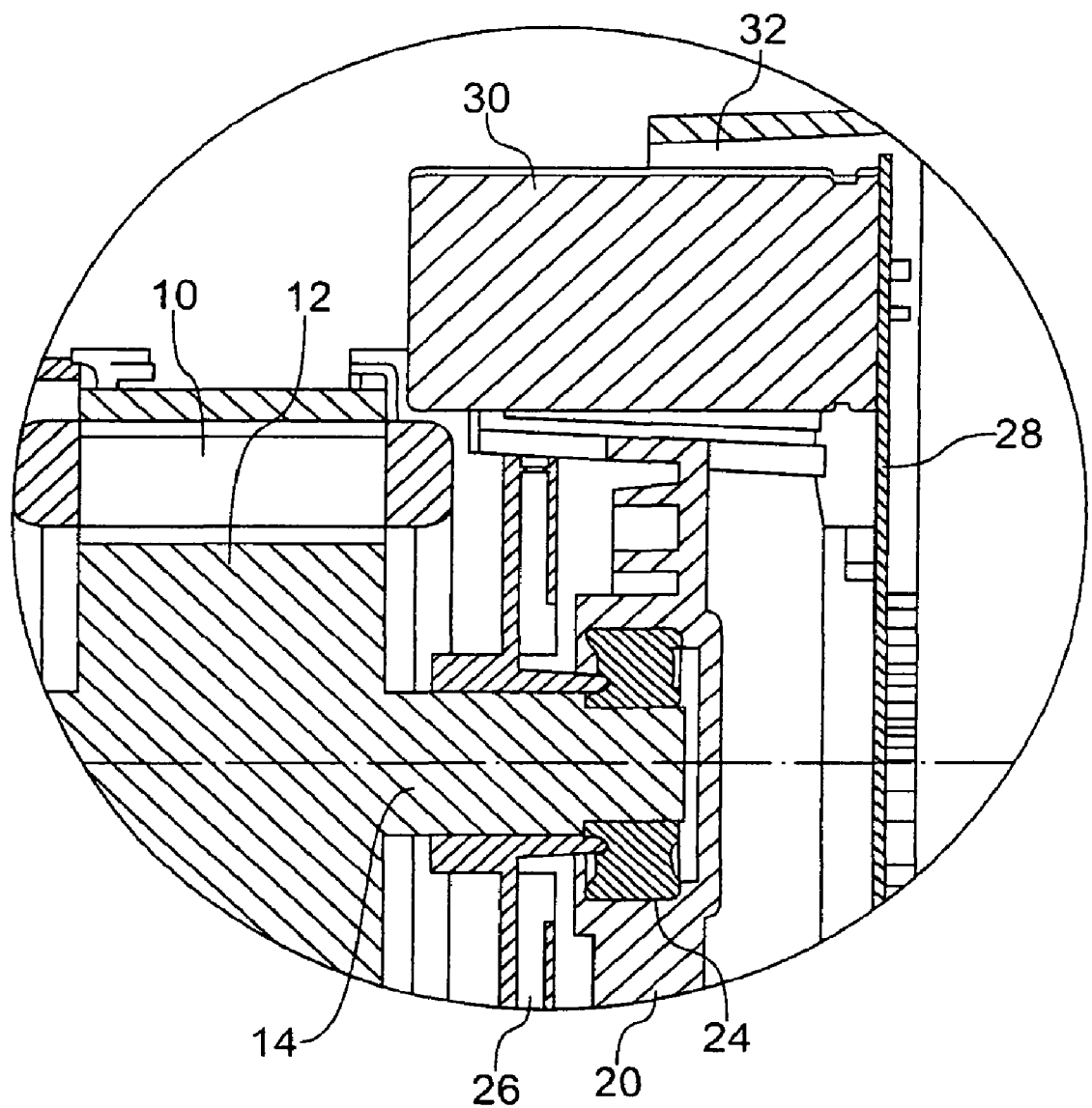
FIG. 2 is an enlarged, sectional view of a portion X of FIG. 1.

Referring now in detail to FIGS. 1 and 2 of the drawings, the structure and manner in which a drive apparatus for a washing machine according to a preferred exemplary embodiment of the invention operates, will now be explained below.

The drive apparatus contains an electric motor which, in particular, contains stator cores 10 and a rotor 12. The rotor 12 is connected to a drive shaft 14 which transmits rotary force that is generated by the electric motor 10, 12 to a drum of a washing machine, for example through a belt pulley 16. In this exemplary embodiment, the drive shaft 14 is integrally formed or in one piece with the rotor 12 of the electric motor.

Since the electric motor 10, 12 does not have to be modified and at most has to be slightly modified in comparison with conventional drive apparatuses for washing machines, a detailed description of the electric motor has been omitted. The electric motor 10, 12 can, in particular, be both an asynchronous motor and a synchronous motor with one phase or with more than one phase.

The drive shaft 14 (and the rotor 12 of the electric motor) is rotatably held on a front A-end plate 18 and a rear B-end plate 20 through the use of corresponding mounts 22, 24. The end plates 18, 20 are used to mount the drive apparatus in a washing machine, for example through the use of screw connections. At its distal end, the drive shaft 14 is also provided or constructed with the belt pulley 16 or the like, through the use of which the drive force from the electric motor 10, 12 and the drive shaft 14 can be transmitted to a non-illustrated washing machine drum. As an alternative, however, it is also feasible for the drive shaft 14 to be directly coupled to the washing machine drum.

A fan 26 for generating a cooling air stream for cooling the electric motor, in particular electronic components, is provided between the two end plates 18, 20.

The fan 26 is, for example, made up of a fan impeller which is mounted on the drive shaft 14 and rotates with the drive shaft. The fan impeller is therefore automatically rotated at the same rotational speed as the drive shaft 14, with the result that a more intense cooling air stream is automatically generated by the fan 26 at a higher rotational speed of the electric motor 10, 12, and the electric motor 10, 12 and power components 30 are sufficiently cooled. In this case, the fan 26 can be relatively small since it has to provide effective cooling only during a short spin cycle of the washing machine and it has a higher rotational speed precisely during such a spin cycle. However, it goes without saying that the invention is not only restricted to this embodiment and configuration of the fan 26. For example, the fan can also be provided separately from the drive shaft 14 in the housing of the drive apparatus.

The washing machine drive apparatus also has electronics for controlling the electric motor 10, 12, in particular for supplying power to and controlling the rotational speed of the electric motor. These electronics include, in particular, a printed circuit board 28 on which, inter alia, some power components 30 are mounted. In a drive which is fed by an intermediate circuit and has an asynchronous or synchronous motor, these power components 30 are, for example, intermediate circuit capacitors, choking coils for attenuation of harmonics and radio interference suppression coils, mains rectifiers and switch-on current limiters, such as an NTC or fixed resistor.

The external shape of the motor scarcely differs from that of a conventional washing machine drive. The only difference is that the rear end plate 20 is somewhat modified. In particular, the rear end plate 20 has at least one aperture 32, the purpose of which will be explained later.

The rear end plate 20 forms a dividing or partition wall in the common unit of the invention, and the electric motor 10, 12 is disposed on one side of that dividing or partition wall. The electronics for controlling and supplying power to the electric motor 10, 12 (rotational-speed control system, single-phase or multi-phase voltages of variable frequency and amplitude) are disposed behind this dividing or partition wall 20, that is to say on that side of the dividing or partition wall which is averted from the electric motor 10, 12. These electronics include, in particular, the printed circuit board 28 and various power components 30, for example intermediate circuit capacitors, a choking coil for attenuation of harmonics and radio interference suppression coil, mains rectifiers and switch-on current limiters such as an NTC or fixed resistor. The sensitive regions of the electronics are shielded from electrical and magnetic interference fields of the electric motor 10, 12 by the end plate 20.

The printed circuit board 28 is disposed behind the end plate 20 in such a way that the conductor tracks, electrical contacts, electrical components and the like are disposed on that side of the printed circuit board which is averted from the dividing or partition wall 20. These elements are therefore also provided on the side which is averted from the cooling air stream that is generated by the fan 26 and are therefore better protected against soiling.

The above-mentioned power components 30, which are usually not at risk of soiling or can be simply constructed in such a way that they are not at risk of soiling, protrude at least partially through the at least one aperture 32 in the rear end plate 20. The contacts of the power components 30 are directed through the printed circuit board 28 and soldered to that side of the printed circuit board which is averted from the dividing or partition wall 20, with the result that the contacts cannot be soiled by the cooling air stream which is generated by the fan 26.

Since the power components 30 protrude at least partially through the end plate 20 and therefore into the space in the electric motor 10, 12 in which the fan 26 is also provided, part of the cooling air stream which is generated by the fan 26 is blown directly onto these power components 30. Care should be taken in this case to ensure that the cooling air stream is blown only onto the housing of the power components 30 and that the electrical connections of the power components are disposed on the other side of the printed circuit board 28 in such a way that they are protected. Furthermore, the power components 30 can also be cooled indirectly through the use of the dividing or partition wall 20 which, for its part, is cooled by the cooling air stream that is generated by the fan 26. Due to this cooling by the fan 26, the power components 30 can be constructed to be smaller and less expensive than in conventional washing machine drives.

During a washing cycle of the washing machine, the drive apparatus only has to emit a low power, with the result that the power components 30 of the electronics are also only slightly heated. The cooling air stream of the fan 26, which is also only weak due to the low rotational speed of the drive shaft 14, therefore does not have to specially cool the power components 30. In contrast, during a short spin cycle in which the power emitted by the electric motor 10, 12 is a multiple of the power output during the washing cycle, the power components 30 of the electronics are also intensely heated. However, in this case the rotational speed of the fan 26 is correspondingly high, with the result that the intense cooling air stream provides sufficient cooling of the power components 30.

The above-described washing machine drive therefore constitutes a simple, compact and cost-effective structure for integrating an electric motor and electronics, which ensures sufficient protection and sufficient cooling of the electronics at the same time.

It is possible to take various additional measures in order to better protect the electronics (including the power components 30) against soiling. For example, the electronics 28, 30 can be entirely or partially coated and/or entirely or partially encapsulated. The electronics 28, 30 can also be entirely or partially covered with plastic parts.

Whereas the printed circuit board 28 of the electronics is disposed behind the end plate 20 and is surrounded by a non-illustrated motor cover in the above-described exemplary embodiment, it is also feasible to modify the rear end plate 20 in such a way that the electronics 28, 30 can be accommodated within the end plate 20.

The invention claimed is:

1. A drive apparatus for a washing machine having a drum, the drive apparatus comprising:
    an electric motor;
    a drive shaft connected to said electric motor for rotary drive, said drive shaft transmitting rotary force generated by said electric motor onto the drum of the washing machine;
    a fan generating a cooling air stream for cooling said electric motor;
    electronics for controlling operation of said electric motor, said electronics including a printed circuit board and power components;
    said electric motor and said electronics being integrated in a common unit, said common unit having a dividing wall with at least one aperture formed therein;
    said electric motor and said fan being disposed on one side of said dividing wall and said printed circuit board being disposed on the other side of said dividing wall; and
    at least one of said power components protruding at least partially through said at least one aperture and being cooled by contact with said dividing wall or said cooling air stream.

2. The drive apparatus for a washing machine according to claim 1, wherein said printed circuit board has a side averted from said dividing wall and conductor tracks disposed on said side averted from said dividing wall.

3. The drive apparatus for a washing machine according to claim 1, wherein said electric motor has a rotor, and said dividing wall is an end plate for rotatably mounting said drive shaft and said rotor.

4. The drive apparatus for a washing machine according to claim 1, wherein said electric motor and said electronics are integrated in a common motor housing.

5. The drive apparatus for a washing machine according to claim 1, wherein said power components protruding through said dividing wall are selected from the group consisting of intermediate circuit capacitors, choking coils for upper harmonics, radio interference suppression coils, mains rectifiers and switch-on current limiters.

6. The drive apparatus for a washing machine according to claim 1, wherein said electronics are entirely or partially coated to protect against at least one of dust or moisture.

7. The drive apparatus for a washing machine according to claim 1, wherein said electronics are entirely or partially encapsulated.

8. The drive apparatus for a washing machine according to claim 1, wherein said electronics are entirely or partially provided with plastic covers.

9. The drive apparatus for a washing machine according to claim 1, wherein said dividing wall has a substantially rectangular construction.

* * * * *

UNITED STATES PATENT AND TRADEMARK OFFICE
CERTIFICATE OF CORRECTION

PATENT NO. : 7,741,741 B2  Page 1 of 1
APPLICATION NO. : 11/827839
DATED : June 22, 2010
INVENTOR(S) : Martin Weinmann et al.

It is certified that error appears in the above-identified patent and that said Letters Patent is hereby corrected as shown below:

On the Title Page:

Item (73) should read as follows:

(73) Assignee: Diehl AKO Stiftung & CO. KG
Wangen (DE)

Signed and Sealed this

Twenty-sixth Day of October, 2010

David J. Kappos
*Director of the United States Patent and Trademark Office*